(12) United States Patent
Nieberding

(10) Patent No.: US 6,192,858 B1
(45) Date of Patent: Feb. 27, 2001

(54) METHOD FOR OPERATING A FOUR-STROKE INTERNAL COMBUSTION ENGINE

(75) Inventor: Rolf-Günther Nieberding, Fontainebleau (FR)

(73) Assignee: DaimlerChrysler AG, Stuttgart-Mohringen (DE)

( * ) Notice: Subject to any disclaimer, the term of this patent is extended or adjusted under 35 U.S.C. 154(b) by 0 days.

(21) Appl. No.: 09/438,752

(22) Filed: Nov. 11, 1999

(30) Foreign Application Priority Data

Nov. 13, 1998 (DE) ............................................. 198 52 552

(51) Int. Cl.$^7$ ............................ F02B 9/06; F02B 47/08
(52) U.S. Cl. ............................ 123/323; 123/568.14
(58) Field of Search ............................ 123/323, 294, 123/295, 305, 568.14, 27 GE, 27 R, 526, 620, 436

(56) References Cited

U.S. PATENT DOCUMENTS

| | | | |
|---|---|---|---|
| 3,577,727 | * 5/1971 | Warren | 123/323 |
| 3,941,113 | * 3/1976 | Baguelin | 123/179 R |
| 5,150,678 | * 9/1992 | Wittmann et al. | 123/321 |
| 6,009,861 | * 1/2000 | Kreuter | 123/568.14 |

* cited by examiner

Primary Examiner—Henry C. Yuen
Assistant Examiner—Mahmoud Gimie
(74) Attorney, Agent, or Firm—William J. Coughlin

(57) ABSTRACT

A method for operating a four-stroke internal combustion engine which allows the combustion-chamber pressure to be equalized in a cylinder-selective manner consistent with the cycle, in which the quantity of exhaust gas retained with valve closure overlap selected is controlled or preset as a function of the engine speed and load by an exhaust throttle valve affecting all the combustion chambers, and the pressure in the individual combustion chambers when the inlet members are opened is equalized by corresponding cylinder-selective activating injection in a manner consistent with the cycle.

6 Claims, 1 Drawing Sheet

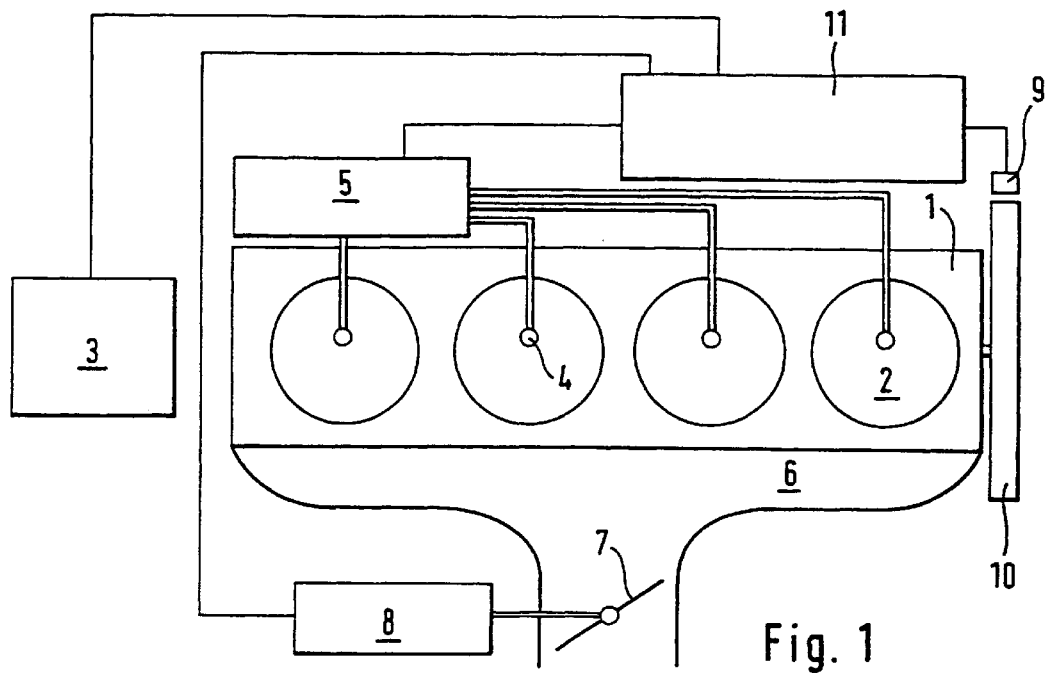
Fig. 1
Fig. 2
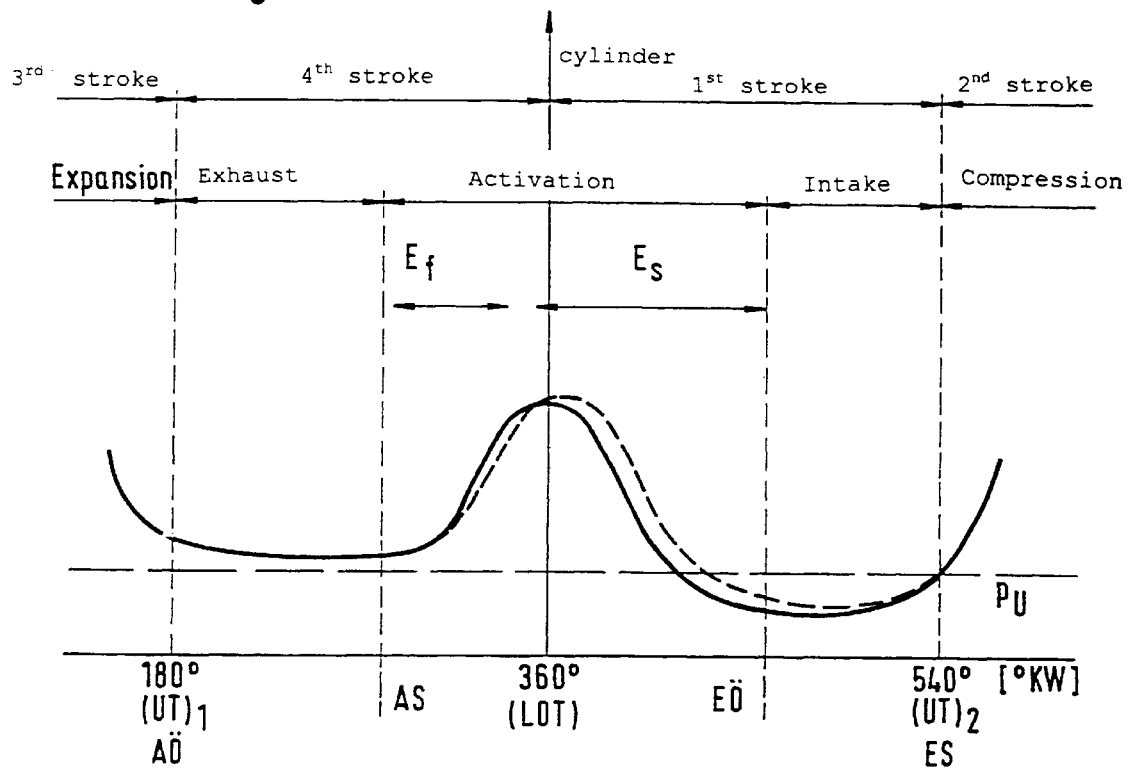

METHOD FOR OPERATING A FOUR-STROKE INTERNAL COMBUSTION ENGINE

CROSS REFERENCE TO RELATED APPLICATION

Priority is claimed with respect to German Application No. 198 04 988.9-13 filed in Germany on Nov. 13, 1998, the disclosure of which is incorporated herein by reference.

The invention relates to a method for operating a four-stroke internal combustion engine, in particular a four-stroke internal combustion engine with exhaust-gas retention and exhaust-gas throttling.

An internal combustion engine is taken to be a machine which burns mixtures of air and fuel in a number of variable volumes and converts the energy released into mechanical energy by way of the gas pressure generated in the volumes. The mixtures are formed within a combustion chamber.

At least at idle and/or at part load, combustion is initiated by compression ignition. With lean mixtures, this offers good potential for burning air/fuel mixtures with good efficiency and little formation of nitrogen oxides. At the compression ratios customary in engines, this type of combustion can only be implemented by exhaust-gas retention and exhaust-gas activation. Here, exhaust-gas activation refers to an activating injection of fuel into hot compressed exhaust gas. It is only possible to implement such combustion stably within a narrow range of the characteristic map. However, stable combustion requires rapid control, particularly in the case of non steady-state operation. Mechanical control systems such as flaps or valves are too slow for this purpose and are too expensive for a cylinder-selective design.

Compression ignition is effected by increasing the temperature of the air/fuel mixture. The temperature of the fresh mixture is increased by mixing it with the exhaust components of the preceding cycle and by the subsequent geometrical compression of the enclosed maximum initial volume to a residual volume. The temperature in the remaining compressed volume rises to a level such that it ignites the mixture. By virtue of the energy released, the combustion process which follows the compression ignition of lean mixtures is a self-sustaining or self-reinforcing process. This combustion can be initiated and controlled by variable compression by means of variable closure of the inlet or by way of variable exhaust-gas retention with activating injection. A knock-free increase in load can be achieved by vaporization cooling with fuel injected at a late stage.

The combustion of the homogeneous air/fuel mixture is dependent on the proportions in the mass in the combustion chamber of retained exhaust gas together with the excess air from the preceding cycle, the cold fresh air fed in and the fuel introduced directly into the combustion chamber. The particular composition of the mixture influences the beginning and hence progress of the release of energy. The high proportion of retained exhaust gas influences the next cycle. Pilot control of combustion is possible by selective injection in the context of activation.

For this purpose, fuel is injected into the exhaust gas retained in the combustion chamber, thereby bringing about a predominantly endothermic preliminary reaction of the fuel fed in by means of the heat of the exhaust gas and the hot residual air, a reaction which influences the subsequently compressed full charge when the exothermic reaction is initiated.

U.S. Pat. No. 6,105,550 which is not a prior publication, describes an internal combustion engine of the same generic type in which the mechanical concept required for the implementation of compression ignition in engines is explained. The exhaust-gas retention required is achieved by mechanical pilot control by means of a camshaft that can be switched in binary fashion and the switched-over cam shape of which leads to shorter valve timings (valve closure overlap) and hence to compression of the exhaust gas retained. The quantity of exhaust gas is controlled by means of an exhaust throttle valve downstream of the outlet members. This valve controls the quantity of exhaust gas retained in the combustion chamber by means of the back pressure and the resulting pressure difference with respect to the combustion chamber.

An activating injection into the exhaust gas retained and spark ignition of homogeneous stoichiometric mixtures are furthermore provided for full-load operation.

However, retention of exhaust gas by causing an exhaust-gas build-up downstream of the combustion chamber is subject to inertias associated with the dynamics of gases and cannot be pilot-controlled in a cylinder-selective manner. Cyclic compensation of previous influences or pilot control for selective rapid and dynamic changes in the load and engine speed can be controlled only with difficulty from the exhaust end of the engine and is complex in terms of control because of dead times and hystereses.

Cylinder-selective fitting of the individual exhaust lines with individual butterfly valves is thermally problematic in load mode and is complex in terms of design. Moreover, the inner cylinders of a multi-cylinder engine suffer less heat loss and hence exhibit higher gas temperatures, leading to differences in the quantity and density of the exhaust gas retained in the individual combustion chambers. As a result, the progress of combustion in the inner cylinders is different from that in the outer cylinders, something which permanently prejudices the smoothness of running of the engine and nonsteady-state operation.

SUMMARY OF THE INVENTION

The object on which the invention is based is to specify a method for a multi-cylinder internal combustion engine of the generic type by means of which the combustion-chamber pressure at the end of exhaust-gas compression can be equalized in a cylinder-selective manner consistent with the cycle.

The object is achieved by a method with the following features.

Exhaust-gas retention is controlled as a function of the speed and load of the internal combustion engine by just one exhaust throttle valve in the exhaust line. For low loads and engine speeds, this valve is closed to the maximum extent, with the result that the largest possible proportion of exhaust gas is retained in the combustion chambers. As the engine speed rises, the exhaust throttle valve exposes a larger cross section and thus allows a higher mass flow. As the load rises, the temperature of the exhaust gas increases, with the result that less exhaust gas has to be retained and hence less exhaust-gas throttling is required to initiate the reaction. The exhaust throttle valve is accordingly used for pilot control of the operating point and can be controlled to a limited extent in a nonsteady-state manner.

By skilful variation of the activating injection, it is possible to influence the pressure in the combustion chamber when the inlet member is opened. The activating injection is divided into an early and a late injection, depending on the injection point. In the case of the early activating injection, the reaction activity releases energy during the activation phase. The combustion-chamber pressure rises in comparison with exhaust-gas retention without activation. As a result, a lower vacuum relative to the surroundings is obtained when the inlet members are opened, thereby reducing the filling of the combustion chambers.

Late injection alters the pressure variation during the expansion of the exhaust gas only due to the cooling brought about by the vaporization of the fuel since chemical reactions are retarded because of the rapid pressure drop in the rapidly expanding combustion chamber. Early injection, in contrast, increases the pressure in the combustion chamber even during the expansion phase of the exhaust gas retained, because of the release of energy in the exhaust gas. If this is not desired, the exhaust gas in the combustion chamber can be cooled by the vaporization of additional fuel injected at a later stage. The higher density or lower pressure of the cooled mass allows a larger charge. Activating injection is therefore a suitable means of selectively changing the pressure prevailing in the combustion chamber when the inlet member is opened. The pressure difference with respect to the unthrottled ambient pressure for drawing in the fresh gas can thus be influenced rapidly and in a manner consistent with the cycle and in a cylinder-selective manner. In particular, it can be stated that the earlier fuel is injected into the exhaust gas retained, the higher is the pressure in the exhaust gas retained and the less fresh air can be drawn in. Maximum retention is obtained when injection is performed directly after the closure of the outlet member. This is also when the greatest effect on the next combustion cycle as regards early release of energy is apparent.

An increase in the fresh charge drawn in to increase the total mass in the combustion chamber and maximize effective compression is achieved by an activating injection shortly before the inlet member is opened. This cools the exhaust gas retained, thereby reducing the combustion-chamber pressure. The quantity of fresh air drawn in and volumetric efficiency are increased. The effect of a late activating injection on the onset of reaction in the next operating cycle is minimal.

If part of the fuel is injected into the retained exhaust gas at the beginning of the activation phase, after the closure of-the outlet member, and a second part is injected shortly before the opening of the inlet member, the heat of vaporization of the second part largely absorbs the energy released from the first part. This lowers the combustion-chamber pressure and increases the quantity of fresh air drawn in. Due to the early beginning of activation, there is still sufficient activated mixture in the form of reactive radicals present in the combustion chambers, even after partial cooling of the charge. Splitting the activating injection while keeping the overall quantity of fuel injected the same thus combines the advantages of activating the exhaust gas retained and reducing the pressure, which increases its volumetric efficiency. The two effects are largely decoupled.

With increasing engine output, the gas temperature and with it the formation of nitrogen oxides rises sharply. At the same time, the density of the exhaust gas decreases as the temperature of the exhaust gas increases. Exhaust-gas retention increases the mean temperature of the exhaust gas before the beginning of the compression and hence reduces the cylinder charge. As the cylinder charge decreases, the excess of air for the same quantity of fuel (i.e. the same load) is reduced. The mixture becomes richer in fuel on average. The intensity of the reaction increases, pressure rises are steeper and peak temperatures are higher. To increase the maximum load while, at the same time, avoiding nitrogen oxides, a reduction in the mean gas temperature before the beginning of compression is aimed for by maximizing the proportion of fresh air.

The requirement for exhaust gas can be minimized, even in the case of relatively high load and engine speed, by means of an extremely late activating injection or one which is divided up in an appropriate manner. The mass of exhaust gas retained is cooled. By virtue of the activation of the reaction kinetics, a small mass of exhaust gas is required. The colder the fresh air, the higher the volumetric efficiency, the lower the mean temperature of the mixture and the less the formation of nitrogen oxides. The quantity of fuel for activation is part of the total quantity of fuel used to set the optimum time of energy release.

Thanks to the speed with which it can be controlled, the activating injection according to the invention offers the possibility of achieving cylinder-selective fine adjustment of the combustion-chamber pressure in a manner consistent with the cycle before the opening of the inlet member and hence equalization of the individual combustion chambers as regards volumetric efficiency and combustion. This is accomplished without a mechanical actuating intervention into valve timings and the position of the exhaust throttle valve.

However, valve closure overlap is a prerequisite for exhaust-gas retention, and, by means of the exhaust throttle valve, the quantity of exhaust gas retained is adapted by way of the pressure difference with respect to the combustion chambers to the time cross section, which has changed with the engine speed. However, the exhaust throttle valve cannot equalize the differences in charge between the individual combustion chambers. As explained above, this is accomplished using the strategy of activating injection with its cylinder-selective fine adjustment of the charge and reactivity.

Control of combustion with compression ignition of lean mixtures of air, fuel and retained exhaust gas is possible with a plurality of control circuits arranged in a cascaded manner. On the one hand, the binary switching of a valve closure overlap required for exhaust-gas retention is controlled. This is accomplished by means of a cam shape which has a significantly smaller opening angle than the cam shape for high-load operation.

The second control circuit controls the exhaust throttle valve by means of which the quantity of exhaust gas retained for the exhaust and refill cycle of the entire multi-cylinder engine is determined as a function of the speed and load of the latter. At low loads and engine speeds, the throttle valve is largely closed but, as the engine speed under load rises, it is successively opened. It is thus used for pilot control of the operating point and can also be controlled to a limited extent in the nonsteady state.

A third control circuit relates to the activating injection. By virtue of the effect of the activating injection on exhaust-gas retention, combustion-chamber-specific matching can be implemented in an electronically controlled manner. This can be applied as a basis by way of a characteristic map and engine temperatures. Combustion can be influenced dynamically by means of the composition of the charge consisting of retained exhaust gas and residual air, fresh air and fuel and by means of the release of energy. When the internal combustion engine is operated in a nonsteady-state manner, the quantity of charge in the combustion chambers is maximized when the load is increased in order to optimize the transition from compression ignition of lean mixtures at part load to spark ignition of stoichiometric, homogeneous mixtures at full load.

BRIEF DESCRIPTION OF THE DRAWINGS

Further features of the invention will emerge from the patent claims and the description which follows. Illustrative embodiments of the invention are explained in greater detail with reference to the following description and the drawing, in which:

FIG. 1 is a schematic diagram of an internal combustion engine with four combustion chambers and exhaust-gas retention, FIG. 2 is a diagram showing the combustion-chamber pressure during the exhaust and refill cycle.

DETAILED DESCRIPTION OF THE PREFERRED EMBODIMENTS

FIG. 1 shows a four-stroke internal combustion engine with a cylinder block 1 in which there are four combustion chambers 2. The exhaust and refill cycle is performed by means of inlet and outlet members (not shown) driven by a camshaft (not shown). The said camshaft can be switched by means of a switchover device 3 between the cam shape for valve opening overlap (spark-ignition mode) and the cam shape for exhaust-gas retention (compression-ignition mode).

The fuel (generally petrol) is injected into the combustion chambers 2 at high pressure by injection valves 4 actuated by an injection unit 5. The exhaust gas is collected in an exhaust line 6 in which an exhaust throttle valve 7 common to all the combustion chambers is arranged. This throttle valve is actuated by a throttle actuator 8.

A revolution counter 9 picks off the non-uniformity in the revolutions of the internal combustion engine at the circumference of a flywheel 10. A computer 11 evaluates the fluctuations in the rotational speed of the flywheel 10 and measured values from any ionic-current probes in the combustion chambers 2 and, on this basis, controls the injection unit 5, the switchover device 3 and the throttle actuator 8.

The method according to the invention will be explained with reference to FIG. 2:

The curve 11 of the pressure variation in the combustion chambers 2 begins in the third stroke with the final phase of expansion after combustion with excess air. The opening point of the outlet member, which marks the beginning of the fourth stroke and the expulsion of the exhaust gases, is at the first bottom dead centre position $(UT)_1$ at crank angle KW=180°. During expulsion, the curve 11 is above the line $p_u$ for the ambient pressure, the distance between the curve 11 and the line $P_u$ during expulsion depending on the position of the exhaust throttle valve 7 and the engine speed.

The expulsion phase ends at the closing point AS of the outlet member, and the activation phase begins. This ends with the opening point EÖ of the inlet member. Compression and activation of the exhaust gas retained takes place between the closing point AS and the opening point EÖ. Activation consists in an activating injection of fuel into the exhaust gas. This can take place either in the initial stage $E_f$ only or in the final stage $E_s$ only or at both stages of the compression process. The solid curve 11 represents activating injection at the late stage only, while the dashed part of the curve shows the variation when an activating injection is performed at an early stage. Due to the cooling of the exhaust gas retained, activating injection at an early stage lowers the compression pressure and, after the onset of the exothermal reaction in the region of the dead center position LOT associated with exhaust and refill, this leads to an increase in pressure relative to the compression pressure.

Due to the heat of vaporization of the fuel, an additional, late-stage, activating injection would lead to a pressure equalization to the pure compression curve during expansion, in the region of the opening point EÖ of the inlet member. At the opening point EÖ, both curves are below the line $P_u$ for the ambient pressure, thereby preventing the exhaust gas retained from flowing into the inlet region. The level of the vacuum at the opening point EÖ determines the volumetric efficiency of the internal combustion engine. If an activating injection is performed at an early stage, the vacuum at the opening point EÖ is at its lowest and the temperature and kinetic activity of the exhaust gas retained is at its highest. This means maximum activation energy combined with minimum volumetric efficiency, a condition which is optimum for the low idle-speed range.

An additional activating injection at a late stage lowers the combustion-chamber pressure at the opening point EÖ, thereby increasing volumetric efficiency. At the same time, the thermal component of the activation energy is reduced, while its reactive, chemical component (radical formation) is maintained. This condition is particularly suitable for the higher part-load range.

After the opening point EÖ of the inlet member, the intake phase begins, and this continues until the closing point ES of the said inlet member at the second bottom dead centre position $(UT)_2$ at a crank angle of 540° KW, where it merges into the compression phase. Here, the initiation of the reaction takes place by means of a homogeneous supply of thermal or chemical energy.

If the activating injection is performed at an extremely late stage, a high volumetric efficiency is achieved with low activation energy, a condition which is desirable for the transition to spark ignition.

At full load, the camshaft is switched to valve opening overlap, the exhaust throttle valve is opened completely and the fuel is injected into the intake phase. This provides maximum volumetric efficiency. Activation is now replaced by spark ignition.

The exhaust throttle valve, the switchable camshaft, the activating injection and spark-ignition injection are controlled by control circuits arranged in a cascade configuration. While the exhaust throttle valve results in a build-up of exhaust gas which is the same for all combustion chambers and is unsteady to only a limited extent, the design of the activating injection according to the invention allows cylinder-selective control of the volumetric efficiency and activation energy of each individual combustion chamber in a manner which is consistent with the cycle and hence allows smooth running of the internal combustion engine.

While the above description constitutes the preferred embodiment of the invention, it will be appreciated that the invention is susceptible to modification, variation, and change without departing from the proper scope or fair meaning of the accompanying claims.

What is claimed is:

1. A method for operating a four-stroke internal combustion engine with the following features:
   fuel is injected directly into at least one combustion chamber, the volume of which changes cyclically,
   fresh gas is fed in by means of at least one inlet member and exhaust gas from combustion is discharged by mean of at least one outlet member,
   at part load, a lean basic mixture of air, fuel and retained exhaust gas is formed and, at full load, a stoichiometric mixture is formed, compression ignition is performed at part load and spark ignition is performed at full load, and with mechanically controlled exhaust-gas retention with selectable valve closure overlap and exhaust-gas throttling, and with activating injection into the exhaust gas retained, comprising the steps of:

setting the quantity of exhaust gas retained with valve closure overlap selected as a function of the engine speed and load by an exhaust throttle valve affecting all the combustion chambers, and equalizing the pressure in the individual combustion chambers when the inlet members are opened by corresponding cylinder-selective activating injection in a manner consistent with the cycle.

2. The method according to claim 1, wherein the cylinder-selective activating injection is variable as regards the injection quantity, injection point and injection frequency.

3. The method according to claim 2, wherein the cylinder-selective activating injection is performed in the region of the end and/or beginning of the compression of the exhaust gas retained.

4. The method according to claim 3, wherein volumetric efficiency is maximized by slight exhaust-gas throttling and performing the activating injection at a late stage in the case of a relatively high load and, especially, at the transition from compression ignition to applied ignition.

5. The method according to one of claims 1 to 4, wherein at least the activating injection, the switching camshaft and the exhaust throttle valve are controlled by an electronic control unit in conjunction with characteristic maps of the engine data, taking into account engine temperatures and the fluctuations in the speed of the internal combustion engine.

6. The method according to claim 5, characterized in that control of the position of the camshaft and the exhaust throttle valve and of the activating injection and the spark-ignition mode is performed by a plurality of control circuits acting in a cascaded manner.

* * * * *